United States Patent
Falkenstein

(10) Patent No.: US 8,983,715 B2
(45) Date of Patent: Mar. 17, 2015

(54) METHOD AND DEVICE FOR RECOGNIZING UNINTENDED DRIVE TRAIN RESPONSES OF A MOTOR VEHICLE HAVING AT LEAST ONE DRIVE UNIT

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 13/701,921

(22) PCT Filed: Apr. 5, 2011

(86) PCT No.: PCT/EP2011/055255
§ 371 (c)(1), (2), (4) Date: Feb. 15, 2013

(87) PCT Pub. No.: WO2011/151094
PCT Pub. Date: Dec. 8, 2011

(65) Prior Publication Data
US 2013/0138290 A1    May 30, 2013

(30) Foreign Application Priority Data

Jun. 4, 2010 (DE) .......................... 10 2010 029 706

(51) Int. Cl.
*G01M 17/007* (2006.01)
*B60W 50/00* (2006.01)
(Continued)

(52) U.S. Cl.
CPC ......... *G01M 17/007* (2013.01); *B60W 50/0098* (2013.01); *B60W 50/0205* (2013.01);
(Continued)

(58) Field of Classification Search
CPC .............. B60W 50/0098; B60W 50/0205; B60W 50/023; B60W 2050/0031; B60W 2050/0039; B60W 2050/0006; G01M 17/007

USPC .............. 701/32.8, 32.9, 99, 102, 115; 703/2; 700/28–34
See application file for complete search history.

(56) References Cited

U.S. PATENT DOCUMENTS

| 4,667,787 A * | 5/1987 | Hofmann ....................... 477/175 |
| 2009/0224713 A1 * | 9/2009 | Falkenstein ................... 318/432 |
| 2009/0271099 A1 * | 10/2009 | Jones et al. .................... 701/115 |

FOREIGN PATENT DOCUMENTS

DE     102 60 838    7/2004
DE  10 2004 039756   2/2006
(Continued)

OTHER PUBLICATIONS

International Search Report, PCT International Application No. PCT/EP2011/055255, dated Sep. 5, 2011.
Electronisches Staibilitats-Programm (ESP) fur PKW: "Kraftfahrtechnisches Handbuch," Jan. 1, 1999.

*Primary Examiner* — Russell Frejd
(74) *Attorney, Agent, or Firm* — Kenyon & Kenyon LLP

(57) ABSTRACT

A method for recognizing unintended drive train responses of a motor vehicle includes at least one drive unit, in which at least one input variable of the motor vehicle and/or of the drive unit is input into the drive train, and at least one output variable is measured at the motor vehicle and/or the drive unit. In order to recognize an unintended drive train response early, the at least one input variable is supplied to a dynamic model which at least partially simulates the drive train of the motor vehicle, the dynamic model determining, based on the at least one input variable, at least one model output variable which is compared to the at least one measured output variable, and an unintended drive train response being deduced if there is a difference between the measured output variable and the model output variable.

15 Claims, 4 Drawing Sheets

(51) Int. Cl.
*B60W 50/02* (2012.01)
*B60W 50/023* (2012.01)

(52) U.S. Cl.
CPC ..... *B60W50/023* (2013.01); *B60W 2050/0031* (2013.01); *B60W 2050/0039* (2013.01); *B60W 2050/0006* (2013.01)
USPC ............... 701/32.8; 701/32.9; 703/2; 700/30; 700/31; 700/34

(56) References Cited

FOREIGN PATENT DOCUMENTS

DE  10 2006 017824  10/2007
DE  10 2007 020279  11/2008

* cited by examiner

METHOD AND DEVICE FOR RECOGNIZING UNINTENDED DRIVE TRAIN RESPONSES OF A MOTOR VEHICLE HAVING AT LEAST ONE DRIVE UNIT

CROSS REFERENCE TO RELATED APPLICATIONS

The present application is the national stage entry of International Patent Application No. PCT/EP2011/055255, filed on Apr. 5, 2011, which claims priority to Application No. DE 10 2010 029 706.2, filed in the Federal Republic of Germany on Jun. 4, 2010.

FIELD OF INVENTION

The present invention relates to a method for recognizing unintended drive train responses of a motor vehicle having at least one drive unit, in which at least one input variable of the motor vehicle and/or of the drive unit is input into the drive train, and at least one output variable is measured at the motor vehicle and/or the drive unit, and a device for carrying out the method.

BACKGROUND INFORMATION

In drive trains of motor vehicles, due to cost reasons a direct measurement of instantaneously generated drive torques is usually not provided. Because an electronic gas pedal is used, no mechanical connection to the drive unit is present. However, unintended torque or power outputs of the drive unit may result in the event of software errors or, for example, due to disturbances in the signal transmission between the gas pedal and the control unit which controls the drive unit and which receives the setpoint torque intended by the driver and relays same to the drive unit. In particular in hybrid, hydraulic, or electric vehicles, even for a stationary vehicle a frictional connection may be present between a drive unit and the drive wheels. This undesirable torque or power output of a drive unit, for example due to an error in the data communication or a component defect, may cause a safety-critical movement of the vehicle without this being wanted by the driver.

Such unintended torque or power outputs occur not only in hybrid, electric, or hydraulic vehicles, but also in vehicles having a conventional internal combustion engine drive, and must therefore be monitored in such vehicles as well.

SUMMARY

The method according to the present invention for recognizing unintended drive train responses of a motor vehicle having at least one drive unit, has the advantage that with the aid of the dynamic model, early provision of information concerning a torque output and/or power output by the drive unit is made possible. As the result of at least one input variable of the motor vehicle and/or of the drive unit (a torque or a power, for example) being supplied to a dynamic model which at least partially simulates the drive train of the motor vehicle, the dynamic model determining, on the basis of the input variable, at least one model output variable which is compared to at least one measured output variable, and an unintended drive train response being deduced if there is a difference between the measured output variable and the model output variable, the unintended drive train responses of the motor vehicle may be recognized and, if necessary, minimized. In this way, negative effects such as an unintended movement of the vehicle, for example, are avoided or at least minimized, thus increasing safety in the vehicle. By the use of the dynamic model, errors in the drive train may be recognized very quickly, for example in the millisecond range. An immediate response to these errors by the motor vehicle, for example by activating the brakes, is thus possible in order to reliably prevent movement of the motor vehicle.

In one exemplary embodiment, when multiple measured output variables and multiple model output variables are present, one of the measured output variables is compared to an associated model output variable. This increases the variety of the possible comparisons of the measured variables, resulting in an increase in the reliability of the comparison.

A disturbance variable of the drive train of the motor vehicle is advantageously estimated in the dynamic model. Errors in the actual drive train act as disturbance variables on the actual drive train. Since disturbance variables which act on the actual system of the drive train are not measurable on the actual system of the drive train, with the present invention there is the option of evaluating the disturbance variable via the dynamic model, so that a magnitude of the disturbance variable may be reliably ascertained. Since the disturbance variable which acts only on the actual system of the drive train produces a difference between the output variable measured at the drive train, on the motor vehicle, and/or at the drive unit, and the model output variable of the dynamic model, the disturbance variable may be mathematically ascertained.

In one exemplary embodiment, the value of the disturbance variable of the drive train of the motor vehicle is estimated in the dynamic model using disturbance variable observation methods. With the aid of this disturbance variable estimation, known per se from measurement and control technology, the actual situation of the drive train is simulated or estimated in such a way that the dynamic aspects of the dynamic model match the actual situation.

In one exemplary refinement, the value of the disturbance variable of the drive train of the motor vehicle is compared in the dynamic model to at least one threshold value, at least one drive unit of the motor vehicle being influenced or switched off if the value of the disturbance variable exceeds a first threshold value or is below a second threshold value. Safety-critical situations in the motor vehicle may be reliably recognized with the aid of the disturbance variable estimation in the dynamic model.

In one exemplary variant, the threshold value is a function of an operating state of the drive train. Thus, the first threshold value is increased, for example, for a very dynamic and/or high-magnitude setpoint torque/setpoint power when unevennesses of the roadway, an icy roadway, or drive train vibrations are recognized, during brake, ABS, or ESP interventions, or during shifting of gears.

In addition, the estimated value of the disturbance variable is returned to the part of the dynamic model which at least partially simulates the drive train of the motor vehicle. This feedback results in an approximation between the dynamic model and the actual behavior of the drive train.

A torque and/or a power of the drive unit is/are advantageously used as the input variable and/or estimated as the disturbance variable. The torque and power of the drive unit are typical parameters for an intended change in the behavior of the drive unit, which is transmitted to the motor vehicle. If a torque or an estimated power is used, the torque or power influence of the drive train, or a switch-off of the at least one drive unit, or an activation of a braking system always occurs if a deviation of the torque or the power from a setpoint torque or a setpoint power, respectively, is greater than a permitted deviation.

In one exemplary embodiment, the torque and/or the power of the drive unit act(s) on the mass inertias of the moving parts of the at least one drive unit. Thus, for example, an air gap torque acts on the rotor of an electric machine, or torques due to the gas forces and friction forces act on the crank mechanism of an internal combustion engine. For these variables, a control system usually predefines setpoint values which are suitable for the direct comparison with ascertained or estimated actual values.

In one exemplary refinement, the dynamic model uses or estimates a setpoint torque, a setpoint power, a computed actual torque, and/or a computed actual power of the drive unit. The dynamic model is therefore designed in such a way that it is able to dynamically receive and simulate variables which are received from or output by the actual drive train. Identity between the actual drive train and the dynamic model is thus provided.

In another exemplary variant, the dynamic model simulates control dynamics of the at least one drive unit and/or of other units. The other units may be additional drive units such as electric machines, hydraulic engines, and internal combustion engines, or also units such as clutches, torque converters, converter lockup clutches, and transmissions which have a dynamic response to a control.

In addition, the dynamic model simulates the unit limits of the at least one drive unit and of other units.

In particular, the dynamic model simulates time delays in an electronic signal transmission and/or compensates for same. Thus, the measured output variable as well as the model output variable determined by the dynamic model may be compared as if they had occurred at the same point in time.

The dynamic model advantageously simulates torques and/or powers of mechanically driven auxiliary units. Such auxiliary units include power steering pumps, air conditioner compressors, coolant pumps, and the like. Taking the dynamic behavior of these auxiliary units into account allows a very good simulation of the vibration behavior of the drive train of the motor vehicle.

In another exemplary embodiment, the dynamic model simulates mass inertias of the rotating parts of the mechanically driven auxiliary units. These simulations also contribute to a representation of the dynamic model that is close to reality.

In one exemplary refinement, the dynamic model at least partially simulates elasticities and/or mechanical play in the suspensions of the drive unit, in the suspensions of other units, in a chassis, and/or in the drive train. Taking into account, for example, mechanical play and elasticities in the suspensions of the units or wheel suspensions as well as elasticities of the tires improves the simulation of the vibration behavior of a motor vehicle.

The dynamic model or the parameters of the dynamic model is/are advantageously adapted based on a variation over time of at least one input variable and/or at least one measured output variable. Wear and aging effects or temperature dependencies of the parameters are thus taken into account.

One exemplary refinement of the present invention relates to a device for recognizing unintended drive train responses of a motor vehicle having at least one drive unit, in which at least one input variable of the motor vehicle and/or of the drive unit is input into the drive train, and at least one output variable is measured at the motor vehicle and/or the drive unit. In order to recognize an unintended drive train response early, and thus to reliably prevent significant vehicle acceleration due to the unintended drive train response, means are present which supply the input variable to a dynamic model which at least partially simulates the drive train of the motor vehicle, the dynamic model determining, on the basis of the input variable, a model output variable which is compared to the measured output variable, and an unintended drive train response being deduced if there is a difference between the measured output variable and the model output variable. For this purpose, the dynamic model of the actual drive train is computed. To this end, the dynamic model receives input variables and output variables of the motor vehicle and/or of the drive unit, i.e., variables ascertained at the actual drive train, for example setpoint torques, unit rotational speeds, and/or wheel speeds. During faultless operation, the dynamic model behaves exactly the same way as the actual drive train, i.e., the vibration state in the actual drive train coincides with the vibration state in the dynamic model. Due to the simulation of the actual drive train by the dynamic model, the fault is recognized very early, which is possible within 5 ms, for example. At this point in time the motor vehicle is not yet undergoing significant acceleration, so that a movement or unintended acceleration of the motor vehicle is reliably prevented by initiation of safety measures.

A first control unit which includes the dynamic model is advantageously connected to a second control unit via a communication device which transmits at least one input variable and/or at least one measured output variable. With the aid of two control units, each may initiate a safety measure in the event of a fault. This results in redundancy and a high level of safety, even if there is a defect in one of the two control units.

In another exemplary variant, the first control unit includes a first dynamic model and the second control unit includes a second dynamic model, the first control unit being connected to a power supply, while the second control unit is connected to the drive unit. This has the advantage that two independent switch-off paths are present, resulting in a high level of redundancy and safety, in particular when a control unit is disrupted due to a software error or hardware defect.

In one exemplary variant, the first control unit is designed as a vehicle control unit, and the second control unit is designed as a drive unit control unit. Redundancy is thus present, and if there are disruptions of the vehicle control unit, the ascertainment by the dynamic model may be interrupted so that the drive unit control unit may control and regulate or switch off the drive unit without adverse effects.

The present invention allows numerous exemplary embodiments, one of which is explained in greater detail with reference to the accompanying drawings.

BRIEF DESCRIPTION OF THE DRAWINGS

Identical features are denoted by the same reference numerals in the drawings.

DETAILED DESCRIPTION

Figure 1:
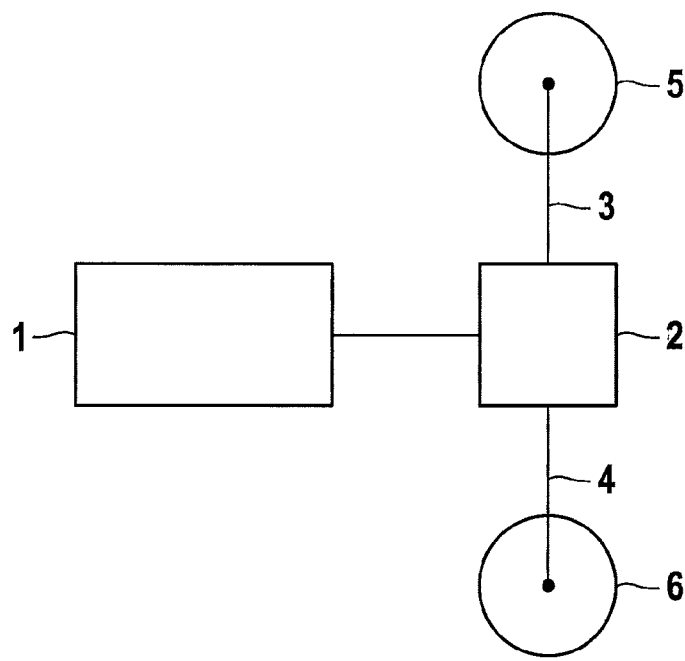
FIG. 1 shows a simplified model of a drive train.

FIG. 1 illustrates a simplified model of a drive train which includes an electric machine 1 which drives drive wheels 5, 6 of the motor vehicle via a transmission 2 and side shafts 3, 4.

Transmission 2 is not shiftable, and thus has only one gear and continually establishes a frictional connection between electric machine 1 and drive wheels 5, 6. The rotor of electric machine 1 is stationary when drive wheels 5, 6 are at a standstill.

The basic concept of the present invention is that a dynamic model or partial model of the vibratory drive train of the motor vehicle is computed.

Figure 2:
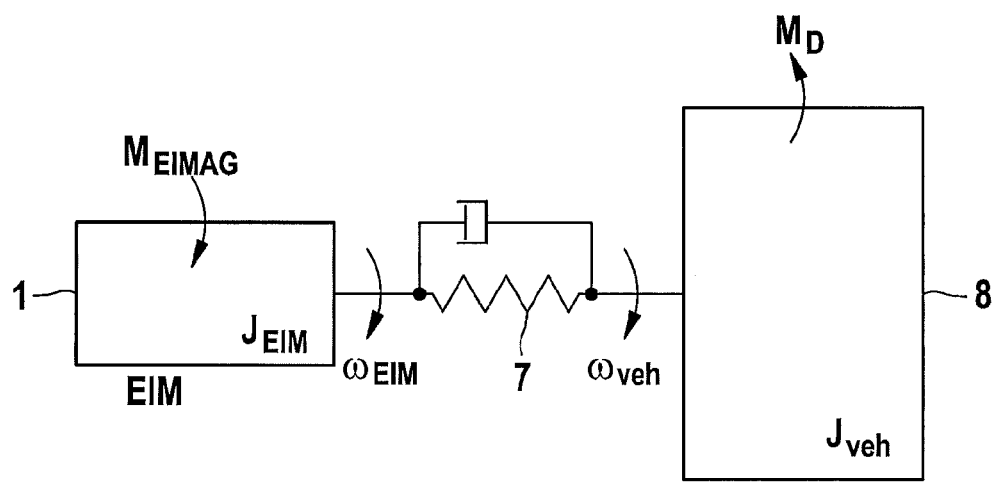
FIG. 2 shows simulation of the drive train according to FIG. 1.

A vibratory simulation of the electric drive train from FIG. 1 is illustrated in FIG. 2. The rotatory inert masses of electric machine 1 and of transmission 2 are simulated in equivalent inertia mass EIM. Equivalent inertia mass EIM is connected via a torsion spring/damper element 7 to an equivalent inertia mass 8 of the motor vehicle which simulates the reduced inertias of drive train parts, wheels, and the translationally moved vehicle mass. Torsion spring/damper element 7 simulates elasticities in the drive train, which are usually characterized by stiffness in side shafts 3, 4. For the sake of simplicity, all inertias, angular velocities, and torques as well as other parameters having actual gear ratios of 2, and the tire radii, are converted and reduced, so that gear ratios of i=1 are assumed in FIG. 2.

Equivalent inertia mass EIM of electric machine 1 and of transmission 2 illustrated in FIG. 2 rotates at angular velocity $\omega_{EIM}$, which is ascertained by a rotational speed sensor, not illustrated, and communicated to a vehicle control system. Equivalent inertia mass EIM has moment of inertia $J_{EIM}$, which is composed of the inertias of the rotor of electric machine 1 and of rotating parts of transmission 2. Air gap torque $M_{EIMAG}$ generated by electric machine 1 as well as torque $M_{SD}$ instantaneously transmitted by torsion spring/damper element 7 act on equivalent inertia mass EIM.

With the aid of moment of inertia $J_{veh}$ of the motor vehicle, equivalent inertia mass 8 simulates other drive train parts, wheels, and the translationally moved vehicle mass, and rotates at angular velocity $\omega_{veh}$. In the actual drive, angular velocity $\omega_{veh}$ may be computed, for example, from the signals of wheel speed sensors at the two drive wheels by averaging, taking the gear ratio into account. Angular velocity $\omega_{veh}$ is available in the vehicle control system. Torque $M_{SD}$, which is instantaneously transmitted by torsion spring/damper element 7, and a tractional resistance torque $M_D$ which simulates the rolling resistance, air resistance, and climbing resistance act on equivalent inertia mass 8.

Figure 3:
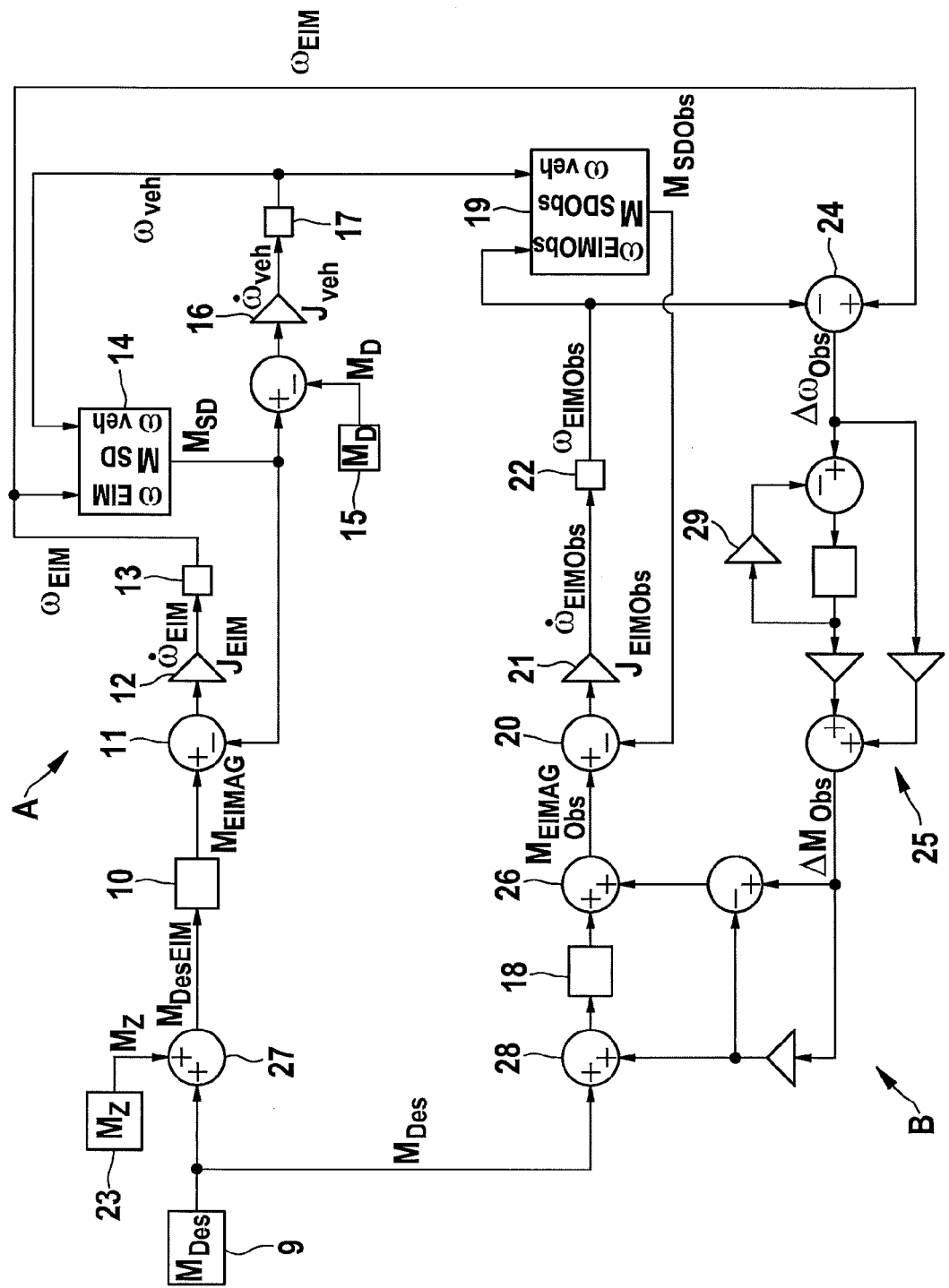
FIG. 3 shows a signal flow chart for one exemplary embodiment of the method according to the present invention.

FIG. 3 illustrates a signal flow chart for one aspect of the method according to the present invention. The actual vibratory drive train is simulated in top part A of FIG. 3. A block 9 specifies a setpoint torque $M_{Des}$ which is ascertained from the position of a gas pedal and/or is predefined by a driver assistance system or a vehicle stability control system. In general, setpoint torque $M_{Des}$ may also be influenced by an idle speed control or an automatic transmission. Setpoint torque $M_{Des}$ may be formed as a function of the operating state of the drive train, for example low pass-filtered or gradient-limited, so as not to excite drive train vibrations.

Dynamic effects in the control behavior of electric machine 1, which result from a current regulation, for example, as well as inductances are stored in block 10. The following description assumes a transmission, with a first-order delay (PT1), from a setpoint torque $M_{DesEIM}$ to air gap torque $M_{EIMAG}$. Air gap torque $M_{EIMAG}$ corresponds to the actual torque of electric machine 1 which actually acts, and follows setpoint torque $M_{DesEIM}$ with a delay.

Air gap torque $M_{EIMAG}$ generated by electric machine 1 as well as torque $M_{SD}$ instantaneously transmitted by torsion spring/damper element 7 act on equivalent inertia mass EIM. Both torques $M_{EIMAG}$ and $M_{SD}$ are combined in node 11. Division by moment of inertia $J_{EIM}$ of equivalent inertia mass EIM in block 12 and integration in block 13 yields angular velocity $\omega_{EIM}$ of equivalent inertia mass EIM. A corresponding operation in blocks 16 and 17 yields angular velocity $\omega_{veh}$ of equivalent inertia mass 8. Torque $M_{SD}$ instantaneously transmitted by torsion spring/damper element 7 is ascertained in block 14, and tractional resistance torque $M_D$ is simulated in block 15.

Bottom part B of FIG. 3 shows an exemplary embodiment of the method according to the present invention having the dynamic model or partial model of the drive train. Angular velocities $\omega_{EIM}$ of equivalent inertia mass EIM and $\omega_{veh}$ of equivalent inertia mass 8 ascertained at the actual drive train as well as setpoint torque $M_{Des}$ are communicated to the dynamic model. The control dynamics of electric machine 1 are modeled as a first-order delay in block 18. Modeled air gap torque $M_{EIMAGObs}$ which is computed in this way is combined in node 20 with a torque $M_{SDobs}$ of the torsion spring/damper element, which is modeled in block 19, and divided by estimated moment of inertia $J_{EIMObs}$ of equivalent inertia mass EIM (block 21). An integrator 22 computes therefrom an estimated value $\omega_{EIMObs}$ of angular velocity $\omega_{EIM}$ of equivalent inertia mass EIM. Estimated angular velocity $\omega_{EIMObs}$ of equivalent inertia mass EIM and angular velocity $\omega_{veh}$ of equivalent inertia mass 8 are used by a model of the torsion spring/damper element, illustrated in block 19, to ascertain modeled torque $M_{SDobs}$.

Under ideal conditions, angular velocity $\omega_{EIM}$ ascertained at the actual drive train and estimated angular velocity $\omega_{EIMObs}$ of equivalent inertia mass EIM coincide. If there is an undesirable torque output of electric machine 1, for example due to an error in the data communication or a software error or component defect, the two variables $\omega_{EIM}$ and $\omega_{EIMObs}$ differ from one another. An undesirable torque output of electric machine 1 acts only on the actual drive train, and thus, on ascertained angular velocity $\omega_{EIM}$, but not on the dynamic model, and thus, not on estimated angular velocity $\omega_{EIMObs}$. An undesirable torque output of electric machine 1 is simulated by a disturbance torque $M_Z$ in block 23 in FIG. 3. Disturbance torque $M_Z$ acts on the actual drive train, but is not measured there.

To estimate disturbance torque $M_Z$, within the meaning of a disturbance variable observer, difference $\Delta\omega_{Obs}$ between the two variables $\omega_{EIM}$ and $\omega_{EIMObs}$ is formed in node 24, and via a proportional-integral feedback 25 as a disturbance variable observer correction torque $\Delta M_{Obs}$, is supplied to modeled air gap torque $M_{EIMAGObs}$ in node 28. Estimated angular velocity $\omega_{EIMObs}$ is thus provided to ascertained angular velocity $\omega_{EIM}$. Disturbance variable observer correction torque $\Delta M_{Obs}$ required for this purpose then corresponds to an estimated value of disturbance torque $M_Z$.

It is assumed that disturbance torque $M_Z$ acts on air gap torque $M_{EIMAG}$ at the actual drive train with control dynamics of electric machine 1 (block 10), for which reason the disturbance torque is supplied in node 27 prior to block 10.

Disturbance variable observer correction torque $\Delta M_{Obs}$ is intended to represent an estimation of disturbance torque $M_Z$, i.e., to approximately conform to disturbance torque $M_Z$. Since disturbance torque $M_Z$ acts prior to the control dynamics of electric machine 1, disturbance variable observer correction torque $\Delta M_{Obs}$ is supplied for the most part (up to 80%, for example) in node 28 to the model prior to the modeled control dynamics (block 18). The two variables $M_Z$ and $\Delta M_{Obs}$ may be directly compared to one another in the simulations.

To avoid an upswing in the disturbance variable observer, a small portion (20%, for example) of disturbance variable observer correction torque $\Delta M_{Obs}$ upstream from the modeled control dynamics is supplied after block 18 in node 26 to the disturbance variable observer path, which has a damping effect. To avoid stability problems due to the interaction of an integrating characteristic in the model of the torsion spring/damper element (block 19) with the integral component of disturbance variable observer correction torque $\Delta M_{Obs}$, stabilizing feedback (block 29) is used for the integral component.

Disturbance variable observer correction torque $\Delta M_{Obs}$ is compared to torque thresholds, resulting in torque reduction or switch-off of electric machine 1 if the disturbance variable observer correction torque exceeds an upper threshold or is below a lower threshold. In this case, an intervention into the braking system is also possible. The torque thresholds are modified, for example, expanded for a very dynamic and/or high-value setpoint torque $M_{Des}$ as a function of the operating state of the drive.

In the dynamic model, setpoint torque $M_{Des}$ is limited to the torque limits of electric machine 1, since actual electric machine 1 is also able to provide only torques within its unit limits. Such limitation is not illustrated in FIG. 3 for the sake of simplicity.

In the present exemplary embodiment, use is made of the vibration capability of the actual drive. When there is an undesirable torque output of electric machine 1, angular velocity $\omega_{EIM}$ which is ascertained at the actual drive train responds even before significant effects result on angular velocity $\omega_{veh}$ of equivalent inertia mass 8, i.e., before the vehicle starts to move. This allows an early response. The method is effective in particular at low rotational speeds or when the vehicle is at a standstill, and at high gradients, i.e., very dynamic behavior of disturbance torque $M_Z$, which represent a high safety risk. The driver may independently respond to a slowly developing disturbance torque $M_Z$ at low gradients.

The parameters of the actual drive train may not be precisely known, or may change over the service life. To provide realistic conditions, the delay (PT1 time constant) of the modeled control dynamics of electric machine 1 (block 18) is decreased by 25% relative to the actual control dynamics of electric machine 1 (block 10). The spring stiffness and damping in the model of the torsion spring/damper element (block 19) are reduced by 10% relative to actual torsion spring/damper element 7 (i.e., block 14). During operation, an adaptation of the model parameters to the parameters of the actual drive is meaningful, and a deviation of 10% therefore appears to be realistic.

Figure 4:
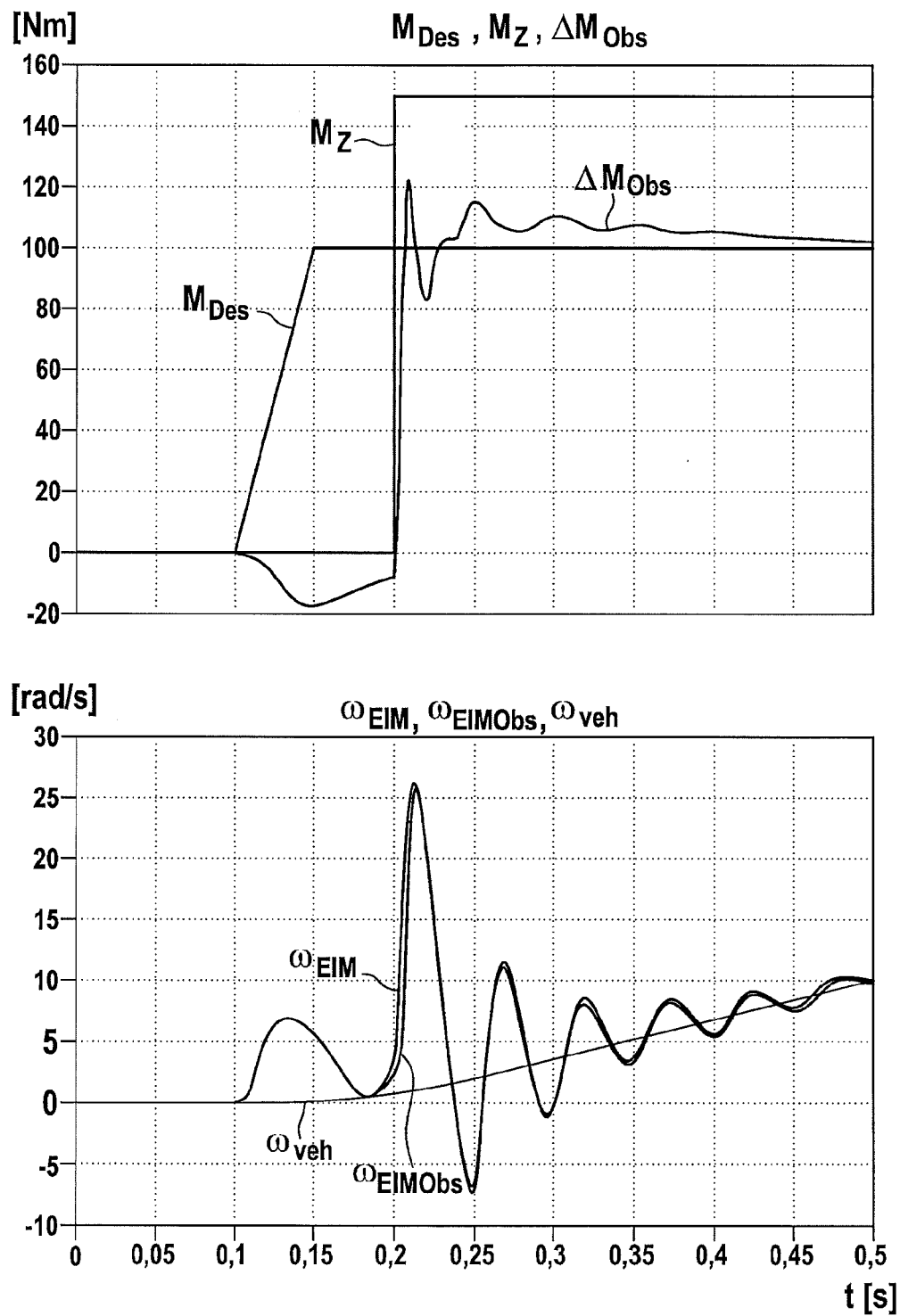
FIG. 4 shows simulation results for a starting operation of the motor vehicle.

FIG. 4 shows simulation results for a starting operation of the vehicle with the aid of a ramp-shaped setpoint torque $M_{Des}$ predefined by the driver. Disturbance variable observer correction torque $\Delta M_{Obs}$ initially drops slightly due to the above-described parameter deviation. At point in time t=0.2 s, disturbance torque $M_Z$ jumps from 0 Nm to 150 Nm. A corresponding disturbance may result on the actual drive, for example due to an error in the data communication or a component defect. The response of disturbance variable observer correction torque $\Delta M_{Obs}$, which represents an estimated value of disturbance torque $M_Z$, is clearly apparent. Thus, for example, electric machine 1 may be switched off as soon as disturbance variable observer correction torque $\Delta M_{Obs}$ exceeds a torque threshold of 40 Nm. The switching-off instruction may be set for less than 5 ms after the disturbance, i.e., in a time period in which angular velocity $\omega_{veh}$, and thus the vehicle movement, has not yet responded to the disturbance. FIG. 4 illustrates the variations in angular velocities $\omega_{EIM}$, $\omega_{EIMObs}$, and $\omega_{veh}$ over time.

Angular velocity $\omega_{veh}$ acts equally on the actual drive and on the dynamic model. This results in a high level of robustness of the method against vibration excitations due to unevennesses of the roadway or an icy roadway, or during brake, ABS, or ESP interventions. As described above, for comparison with disturbance variable observer correction torque $\Delta M_{Obs}$, the torque thresholds are modified as a function of the operating state of the drive. In addition, the integral component of disturbance variable observer correction torque $\Delta M_{Obs}$ may be modified or initialized as a function of the operating state of the drive.

Disturbance variable observer correction torque $\Delta M_{Obs}$ represents an estimated value of disturbance torque $M_Z$, and thus describes a deviation of the actual torque of electric machine 1 from the setpoint torque. The model may also be used to detect a torque on a drive unit which is too low in value, and to take measures, for example in that another drive unit compensates for the missing torque component. In addition, an excessively delaying torque may be detected, and, for example, electric machine 1 may be switched off if there is a risk of excessive delay or locking of drive wheels 5, 6.

Figure 5:
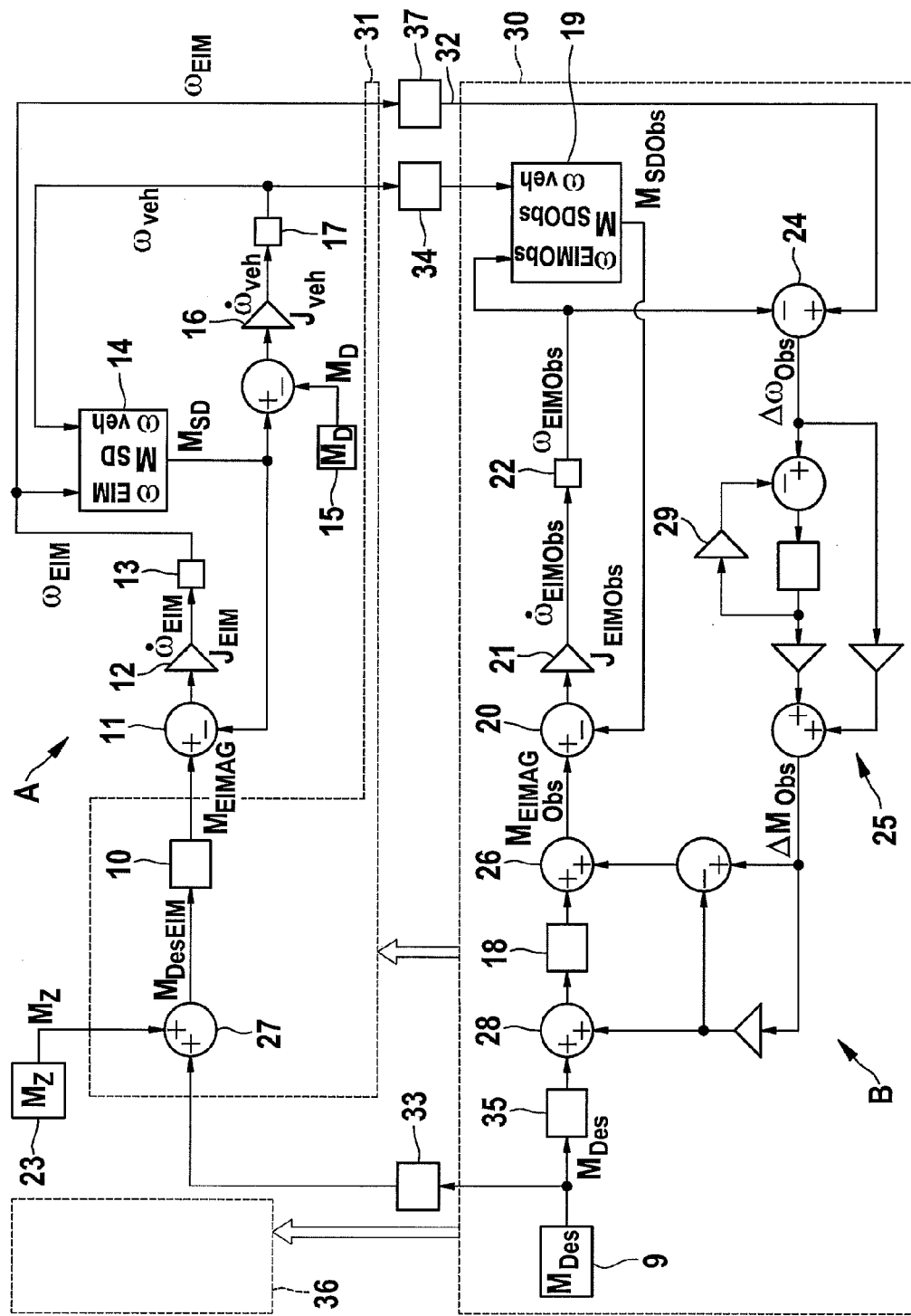
FIG. 5 shows one exemplary embodiment of the device according to the present invention.

FIG. 5 shows an exemplary design of a device for carrying out the method, in a first control unit 30 which is designed as a vehicle control unit, setpoint torque $M_{Des}$ being determined and transmitted to a second control unit 31 via a bus system 32, second control unit 31 being designed as an electric machine control unit. First control unit 30 receives angular velocities $\omega_{EIM}$ and $\omega_{veh}$, which are likewise communicated via bus system 32. For safety reasons, first control unit 30 may also directly read in the sensor signals which are necessary for ascertaining angular velocities $\omega_{EIM}$ and $\psi_{veh}$. Dedicated sensors associated with first control unit 30 may also be installed.

Signal propagation times of the data transmission are simulated in blocks 33, 34, and 37. The dynamic model is computed in first control unit 30. The signal propagation times are compensated for in first control unit 30. This is carried out by delaying setpoint torque $M_{Des}$, with the aid of a block 35, in such a way that the response of the model in the form of angular velocity $\omega_{EIMObs}$ temporally matches the delayed values of angular velocities $\omega_{EIM}$ and $\omega_{veh}$ available in control unit 30. In the event of a detected undesirable torque output of electric machine 1, electric machine 1 and/or a power supply 36 is/are switched off. This switch-off preferably occurs with the aid of a hardware signal, and for safety reasons is redundantly designed. For this purpose, first control unit 30 sends a switch-off signal for electric machine 1 to second control unit 31. Alternatively or additionally, first control unit 30 outputs an appropriate switch-off signal to power supply 36.

In another exemplary design, a first dynamic model is computed in first control unit 30, and at the same time a second dynamic model is computed in second control unit 31. If an undesirable torque output of electric machine 1 is detected with the aid of the first dynamic model, first control unit 30 switches off power supply 36. If an undesirable torque output of electric machine 1 is detected with the aid of the second dynamic model, second control unit 31 switches off the electric machine. These two separate dynamic models and two switch-off paths result in a high level of redundancy and security against, for example, a software error or hardware defect in one of the two control units 30 or 31, which would prevent a necessary switch-off. The redundancy may be further increased by associating different sensors with first control unit 30 and second control unit 31. In this way, the detection of input and output variables of the drive train or of the motor vehicle and/or of electric machine 1 which are supplied to the two dynamic models is also carried out redundantly.

The dynamic model or partial model of the drive train may simulate drive units such as electric machines and hydraulic engines or internal combustion engines, or units such as clutches, torque converters, converter lockup clutches, transmissions, and universal joint shafts, the chassis together with the braking system, and the tires, as well as associated control systems. Inertias, elasticities, mechanical play, friction, losses, dynamic behavior, limits, and the control dynamics may be modeled from drive units, other units, and the chassis or their suspensions. An adaptation of the model parameters to the parameters of the actual drive train is meaningful.

The described method may be used for hybrid, electric, or hydraulic vehicles, as well as for vehicles having a conventional internal combustion engine drive.

What is claimed is:

1. A method for recognizing unintended drive train responses of a motor vehicle having at least one drive unit, comprising:
   inputting at least one input variable of at least one of the motor vehicle and the drive unit into the drive train;
   measuring at least one output variable at the at least one of the motor vehicle and the drive unit;
   supplying the at least one input variable to a dynamic model which at least partially simulates the drive train of the motor vehicle;
   determining by the dynamic model, based on the at least one input variable, at least one model output variable which is compared to the at least one measured output variable; and
   deducing an unintended drive train response if there is a difference between the measured output variable and the model output variable.

2. The method according to claim 1, wherein when multiple measured output variables and multiple model output variables are present, one of the measured output variables is compared to an associated model output variable.

3. The method according to claim 1, wherein a disturbance variable of the drive train of the motor vehicle is estimated in the dynamic model.

4. The method according to claim 3, wherein a value of the disturbance variable of the drive train of the motor vehicle is estimated in the dynamic model using disturbance variable observation methods.

5. The method according to claim 4, wherein the value of the disturbance variable of the drive train of the motor vehicle is compared in the dynamic model to at least one threshold value, at least one drive unit of the motor vehicle being influenced or switched off if the value of the disturbance variable exceeds a first threshold value or is below a second threshold value.

6. The method according to claim 5, wherein the at least one threshold value is a function of an operating state of the drive train.

7. The method according to claim 6, wherein the estimated value of the disturbance variable is returned to a part of the dynamic model which at least partially simulates the drive train of the motor vehicle.

8. The method according to claim 1, wherein at least one of a torque and a power of the drive unit is at least one of used as the input variable and estimated as the disturbance variable, the dynamic model using or estimating at least one of a setpoint torque, a setpoint power, a computed actual torque, and a computed actual power of the drive unit.

9. The method according to claim 1, wherein the dynamic model simulates control dynamics of at least one of the at least one drive unit and other units.

10. The method according to claim 1, wherein the dynamic model simulates at least one of torques and powers of mechanically driven auxiliary units.

11. The method according to claim 1, wherein the dynamic model at least partially simulates at least one of elasticities and mechanical play in at least one of suspensions of the drive unit, suspensions of other units, a chassis, and the drive train.

12. The method according to claim 1, wherein the dynamic model or parameters of the dynamic model are adapted selected based on a variation over time of at least one of the at least one input variable and the at least one measured output variable.

13. A device for recognizing unintended drive train responses of a motor vehicle having at least one drive unit, in which at least one input variable of at least one of the motor vehicle and the drive unit is input into the drive train, and at least one output variable is measured at at least one of the motor vehicle and the drive unit, the device comprising:
   a communication device which supplies the at least one input variable to a dynamic model which at least partially simulates the drive train of the motor vehicle, the dynamic model determining, based on the at least one input variable, at least one model output variable which is compared to the at least one measured output variable, and an unintended drive train response being deduced if there is a difference between the measured output variable and the model output variable.

14. The device according to claim 13, further comprising:
   a first control unit which includes the dynamic model and is connected to a second control unit via the communication device which transmits at least one of the at least one input variable and the at least one measured output variable, the first control unit including a first dynamic model and the second control unit including a second dynamic model, the first control unit being connected to a power supply, while the second control unit is connected to the drive unit.

15. The device according to claim 14, wherein the first control unit is configured as a vehicle control unit, and the second control unit is configured as a drive unit control unit.

* * * * *